J. V. SKOGLUND.
PROCESS OF TREATING NITRATED BODIES.
APPLICATION FILED MAR. 4, 1918.
1,311,017.
Patented July 22, 1919.
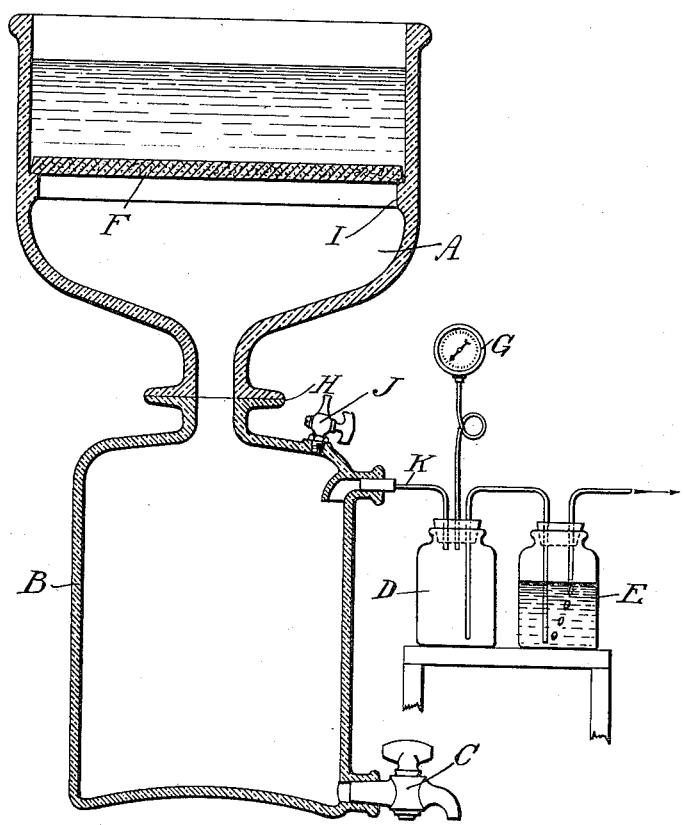
Inventor
Jean V. Skoglund.
by his Attorneys
Howson & Howson

UNITED STATES PATENT OFFICE.

JEAN V. SKOGLUND, OF NEW YORK, N. Y., ASSIGNOR, BY MESNE ASSIGNMENTS, TO TROJAN POWDER COMPANY, OF NEW YORK, N. Y., A CORPORATION OF NEW YORK.

PROCESS OF TREATING NITRATED BODIES.

1,311,017.  Specification of Letters Patent.  Patented July 22, 1919.

Application filed March 4, 1918. Serial No. 220,176.

*To all whom it may concern:*

Be it known that I, JEAN V. SKOGLUND, a citizen of the United States, and a resident of New York, county of New York, State of New York, have invented certain Processes of Treating Nitrated Bodies, of which the following is a specification.

My invention relates to the treatment of nitrated bodies having mixed therewith acids employed in the nitration process, for the purpose of removing and recovering said acids, and its object is to provide a displacement process adapted to the recovery of acids from nitrated bodies which, by reason of their physical characteristics or their sensitiveness to chemical change, cannot successfully be treated by displacement processes heretofore proposed.

In the old displacement process the water used for displacing the strong acid mixture comes in contact with the very strong acid which creates a very high temperature detrimental to the stability of the nitrated product, which will in most cases be decomposed and finally "fired." In order to prevent this I first displace the strong acid with a somewhat weaker acid or acid mixture, and this in turn is displaced with a still weaker acid and so on until it is safe to complete the displacement with water in order to recover all the acid and at the same time free the nitrated product from it. It is obvious that no high temperature will be created, when the strength of the displacing acids are not too far apart. The temperature is still further regulated by having the original nitrated charge and the displacing acids at the proper temperatures.

My invention is applicable to the treatment of nitro-starch and for convenience, in describing the process, I specify nitro-starch as the nitrated body under treatment, but it is to be understood that my process is applicable to the treatment of other similar bodies containing acids in admixture and that in the broader aspect of my invention I do not wish to be confined to the treatment of nitro-starch.

With some nitrated bodies, as for example nitro-cellulose, the mixed acids used in nitration can be displaced by water, and a process, known as the Thompson displacement process, has heretofore been known, by which water is caused gradually to penetrate the nitrocellulose charge to accomplish the displacement. With other nitrated bodies, however, such for example as nitro-starch, in which the nitrated product exists in the mixed acid, not as a series of fibers, but as a series of tiny, round, closely packed granules, the prior process referred to has proved unsuccessful, and so far as I am aware, no satisfactory displacement process for such products as nitro-starch has heretofore been devised. By my process this displacement can be successfully accomplished.

For convenient reference in describing my process, I have illustrated in the accompanying drawing one form of apparatus useful in practising the invention, although it will be understood that I do not confine myself to any particular form of apparatus as a variety of devices can be employed.

In the drawing the single figure is an elevation, partly in section, of the apparatus referred to.

Referring to the drawing, A is the displacing vessel adapted to receive the nitrated charge (by which term is meant the nitrated body being treated, in the presence of the acid used in nitration or the spent acid resulting from nitration). Suitably supported in vessel A, as by rim I, is a filter plate F, which may be a "Filtros" block, porous porcelain or any suitable material sufficiently permeable to the acid under working conditions but not sufficiently porous to permit the passage of the nitro-starch granules. B is the receiving vessel, with suitable connection with vessel A as by ground joint at H, and provided with cock C, and suitable passage for connection with suction tube K, leading through protection vessels D and E to suitable suction source not shown. The suction system is provided with vacuum gage G. Water or a solution of caustic soda in protecting vessel E prevents the fumes drawn from vessel B from destroying the pump or other suction apparatus, and protecting vessel D prevents the liquid in vessel E from finding access to vessel B if the suction inadvertently fails during the carrying out of the process.

In employing said apparatus in carrying out my process, the nitrated charge is run into the upper portion of the displacement vessel A. The amount of nitrated charge which is so admitted is obviously dependent upon the relative proportion of acid to nitrated body, but in general a sufficient amount of nitrated charge is admitted to the upper portion of vessel A to yield a layer of the nitrated product, when sucked free from excess acid, of from one-half inch to three inches in thickness, though of course it is obvious that either a greater or a less thickness of material may be used if desired. In general a thickness of nitrated charge free from excess acid of from two to three inches forms a desirable working range. Expressed in terms of weight per unit of porous surface, it has been found that an amount of nitrated charge corresponding to from two to twelve pounds of nitrated product, on an acid-free and dry basis to each square foot of filtering surface, forms a convenient working quantity.

Having admitted the nitrated charge to the upper portion of vessel A, suction is applied, a suitable reduction in pressure being to twelve inches, as shown on vacuum gage G, which reads 0 at atmospheric pressure, and which would read 30, when showing a perfect vacuum. In other words, a suitable difference of pressure for this work corresponds to a difference of pressure of 6 lbs. per square inch, between the upper surface of the porous plate and the evacuated space beneath.

Under the influence of reduced pressure as described, the excess acid present in the nitrated charge on the plate F passes through the plate, and collects in vessel B. The evacuation as described is maintained until the excess of acid in the nitrated charge has been removed by passing through the porous plate, and the time when this step is completed is readily determined by noting the surface of the nitrated charge in vessel A. As long as an excess of acid is present, the surface of the nitrated charge in the vessel has a "wet" appearance, due to this excess of acid, but as soon as all of the excess acid has been drained off through the porous plate, instead of the smooth appearance due to the presence of excess acid, the charge shows the granular appearance due to the starch granules.

A displacing acid, say of about 56° Bé., is then poured on top of the nitrated material present in the upper portion of vessel A. In adding this displacing acid, care is taken not to disturb or "pit" the surface of the nitrated material. As first displacing acid, sulfuric acid of 56° Bé. may conveniently be used, or a mixture of nitric and sulfuric acids of approximately the same concentration, and in such quantity as will be sufficient to displace the nitrating acid remaining in the charge and present in the pores of the filter block. I have found that nitrostarch after suction has been applied as described until the surface appears dry holds about one and one-half times its own weight of waste acid, while the amount of acid present in the pores of the particular filter plate used can readily be determined. Where the filtering surface used is a Filtros block of "R" porosity, each square foot of filtering surface, with blocks 1⅝ inch in thickness, will have an absorbing capacity of from 3.8 lbs. to 4 lbs. of waste acid.

Suction is again applied, preferably allowing evacuation to proceed until the gage G reads about 12 in. vacuum. This degree of evacuation is allowed to continue until the surplus displacing acid has completely replaced the waste acid present in the nitrated charge. Again the end-point is readily shown by the change in the appearance of the surface of the nitrated material, as already described.

Upon the completion of this first displacement step, air is admitted to the lower portion of vessel A and to vessel B, either by passing through the nitrated material and the plate F, or in any other convenient manner, as by cock J. The acid in B, which now represents the total waste acid originally present in the nitrated charge, may now be removed through the cock C, and utilized in any desired way.

The cock C is next closed, and a suitable volume of second displacing acid, which may be sulfuric acid of 42° Bé., or mixed acid of equivalent strength, is placed in the upper portion of the displacing vessel A. The volume of second displacing acid is exactly the same as the volume of first displacing acid, calculated as already described. The separate steps in the second displacement are exactly the same as in the first displacement, the evacuation being continued as before until the excess of acid has been sucked through, and the surface appears "dry." When this occurs, the suction is again stopped, air is allowed to pass into the lower portion of vessel A and into vessel B, the acid in the lower portion of vessel B is drawn off through the cock C, and the apparatus is ready for the third displacement.

In the third displacement, water may be used, in a three-displacement series. In a multiple-displacement series, where more than three displacements are made, the strength of acid in each displacement would of course be graduated proportionally, but in a three-displacement series the first displacing acid is conveniently sulfuric acid of 56° Bé., the second displacing acid is conveniently 42° Bé. sulfuric acid, and the third displacing medium may be water. In a four-displacement series, the first displacing material could be 60° Bé. sulfuric acid, the second displacing material could be 45° Bé. sulfuric acid, the third displacing material could be sulfuric acid of 30° Bé. and the fourth displacing agent would be water.

In the third displacement, all the steps as already described for the first and second displacements are followed. The volume of displacing material used is the same as the volume used in the first and second displacements. An evacuation of approximately 12 inches is suitable. When the surface shows "dry", the liquid which is collected in the bottom of vessel B is again withdrawn in the manner already fully described, and is run into a storage vessel, since it may conveniently be used in the same step in a succeeding displacement.

The nitrated product in the displacing vessel may now be removed, conveniently by "flushing" it out, or by removing it with a shovel or scoop, and it is washed and otherwise treated in the customary way well known in the art.

The acid recovered from vessel B during the preliminary suction and from the first displacement, is strong waste nitrating acid, of approximately the same composition as originally present in the nitrated charge, and is substantially unmixed with the first displacing acid. The acid recovered from vessel B as the result of the second displacement is of course about the same composition as the original first displacing acid used, but it contains a small amount of nitric acid, usually two or three per cent. The acid recovered from vessel B as the result of the third or water displacement is sulfuric acid of about 42° Bé., but may also contain a small amount of nitric acid. It is of course obvious that the recovered waste nitrating acid may be denitrated, fortified, or otherwise re-used, and the acid recovered from the second displacement may be used as first displacing acid in a succeeding treatment with a new batch of material.

To obtain the most satisfactory results, the process should be carried on under controlled temperature conditions, and I prefer that the average temperature of the nitrated charge shall not exceed 20° C. Temperature control can be secured in any convenient way, as by artificially cooling the filtering surface, and heat generated by displacement in one stage can be compensated for by a lowered temperature of the displacing medium employed in the following stage. The nitrated charge at the outset can be cooled to 15° C. or lower.

It will be understood by those skilled in the art that the details of my process are capable of wide variations. For example, while I have obtained satisfactory results by employing in each stage a volume of displacing medium equal to the volume of acid which is to be displaced, this is not essential. The strength of the first displacing acid and the graduation in strength of the acids employed in the several stages can be varied to suit conditions. The pressure difference between the two surfaces of filter plate may also be varied in degree, although as stated I have found a difference equal to about 12 inches of mercury to be satisfactory. The difference in pressure employed causes the compacting of the nitrostarch granules so that the granules are in contact without substantial films of acid between, but the pressure must not be so great as to compact sufficiently to prevent the outflow of acid. I do not confine myself to the employment of any particular form of apparatus for securing this difference in pressure. It can be secured by the means described, or by applying pressure, as by compressed air, to the upper surface of the membrane; or by centrifugal force by the rotation of the displacing vessel, or by any suitable means.

Instead of displacing in three or four stages as described, it is of course evident that the number of steps can be indefinitely increased, without departing from the spirit of my invention. Where the number of steps becomes large, of course the amount of liquid for each step may be proportionally decreased, and thus ultimately I may displace by a continuous stream of displacing acid of constantly decreasing strength, the displacing acid being present in a tank in layers of successive gravity with acid of say 58° Bé. at the bottom of the tank, and acid successively weaker overlying this, until the acid at the top is so dilute as to be practically plain water. By withdrawing this displacing acid from the bottom of the tank so arranged, and bringing the displaced material cautiously into a similar tank arranged for its reception, a new stock of displacing acid, suitable for re-use, will be obtained after the displacement. It will be noted that after every such displacement, because of the strong acid added from the nitrostarch charge under treatment, the amount of strong acid in the graduated displacement charge will be increased. Accordingly after every such displacement an amount of the strong acid lying in the bottom of the tank will be withdrawn, equal to the amount of strong acid which has been added in the succeeding displacement. After every displacement there will accordingly be a forward progression of the material in the tanks, and this will prevent the intermixing of the different strengths of acid as represented by the desired "layering" of the material, and insures the displacing acid always being in proper condition, when proper precautions are taken to prevent undue disturbance of the material during the course of the displacement.

Claims:

1. The process of treating nitrated bodies admixed with acid which consists in first removing the excess free acid and then displacing the residual mixed acid in stages and under suction, by a series of acids of decreasing concentration, substantially as described.

2. In the treatment of nitrated bodies admixed with acids, the process which consists in treating the mixture in a series of stages with acids of decreasing strength while maintaining the nitrated product at an average temperature not substantially in excess of 25° C. substantially as described.

3. The process of treating nitrated bodies to free the same from mixed acid, which consists in displacing the free acid by acids of a gradually decreasing strength, substantially as described.

4. The process of treating nitrated bodies to free the same from mixed acid, which consists in displacing the free acid by acids of a gradually decreasing strength, and finally washing away the last dilute acid with water, substantially as described.

5. The process of treating nitrated bodies to free the same from mixed acids, which consists in first removing therefrom the excess free acid, then displacing the residual mixed acid in stages and under suction by a series of acids of decreasing strength while maintaining the nitrated product at an average temperature not substantially in excess of 25° C., and finally displacing the last dilute acid by water.

6. The process of treating nitrated products to remove admixed acids which consists in compacting the nitrated charge to remove excess free acid and then displacing the residual acids in stages under suction by a series of displacing liquids containing successively increasing proportions of water.

7. The process of treating nitrated products to remove admixed acids which consists in bringing the mass in contact with a porous septum, establishing a difference of pressure between the mass and the opposite surface of the septum, thereby compacting the mass and removing excess free acid, displacing the residual acid in successive stages by weaker acids and finally by water.

8. The process of treating nitrated products to remove admixed acids which consists in bringing the mass in contact with a porous septum, establishing a difference of pressure between the mass and the opposite surface of the septum, thereby compacting the mass and removing excess free acid, displacing the residual acid in successive stages by weaker acids and finally by water, while maintaining the mass at an average temperature not substantially exceeding 25° C.

9. The process of treating nitrated products to remove admixed acids which consists in bringing the mass in contact with a porous septum, and displacing the admixed acid in successive stages by acids of increasing dilution, while maintaining at each displacement stage a difference of pressure between the mass and the opposite surface of the septum sufficient substantially to compact the nitrated mass without preventing the outflow of acid being displaced.

10. The process of treating nitrated products to remove admixed acids which consists in bringing the mass in contact with a porous septum, applying suction to the opposite surface of the septum sufficient to compact the mass without preventing the outflow of free acid, and displacing the residual acid in successive stages by acids of increasing dilution, while maintaining at each displacement stage the aforesaid application of suction to the opposite surface of the septum.

11. The process of treating nitrated products to remove admixed acids which consists in bringing the mass in contact with a porous septum, applying suction to the opposite surface of the septum sufficient to compact the mass without preventing the outflow of free acid, and displacing the residual acid in successive stages by acids of increasing dilution, while maintaining at each displacement stage the aforesaid application of suction to the opposite surface of the septum, and maintaining the mass at an average temperature not substantially in excess of 25° C.

12. The process of treating nitrostarch to remove mixed acids which consists in bringing the charge at a temperature not substantially in excess of 20° C. in contact with a porous septum, applying and maintaining suction at the opposite surface of the septum until the mass is somewhat freed from acid; displacing the residual acid by mixed acids approximately 56° Bé.; displacing said acids by mixed acids of approximately 42° Bé., said displacements being effected while the charge remains on the septum and subject to the suction aforesaid; again displacing by water; the temperature of the charge at each displacement stage being maintained at not substantially in excess of 20° C.

JEAN V. SKOGLUND.